3,650,984
NITROALKANE OR NITROALKANOL COMPLEX WITH ALKYL-TIN OXIDE OR ALKYL-TIN CHLORIDE
Lawrence R. Jones, Terre Haute, Ind., assignor to Commercial Solvents Corporation
No Drawing. Filed Dec. 29, 1969, Ser. No. 888,805
Int. Cl. C07f 7/22; C08f 45/60, 45/62
U.S. Cl. 260—429.7                8 Claims

ABSTRACT OF THE DISCLOSURE

Polyvinyl halide resin compositions including co-polymers thereof, stabilized against degradation by heat by incorporating therein from 1–10% by weight of a complex obtained by reacting a nitroalkane or nitroalkanol with bis(di-n-butyltin)oxide, bis(tri-n-butyltin)oxide or tri-n-butyltin chloride.

BACKGROUND OF THE INVENTION

This invention relates to vinyl halide resin compositions stabilized against degradation by heat. In a particular aspect, this invention relates to halogenated vinyl resin compositions stabilized by incorporating therein a stabilizing amount of a metallo-organic-tin complex.

The problem of stabilization of halogenated vinyl resins and co-polymers thereof to prevent discoloration and degradation by the effect of heat has long been a troublesome one to the industry. It is discussed by F. F. Holub et al. in U.S. Pat. 3,288,744. For example, unstabilized, plasticized polyvinyl chloride becomes very dark colored after heating 1 hour at 150° C. Numerous additives have been proposed to stabilize vinyl halide resins against degradation by heat. Many of these have been quite successful, but the best ones are quite high in cost and consequently a continuing need exists for lower-cost, effective stabilizers.

SUMMARY OF THE INVENTION

It is an object of the present invention to provide halogenated vinyl resin and co-polymers thereof stabilized against degradation by heat.

It is another object of this invention to provide compositions of halogenated vinyl resins and co-polymers thereof stabilized against degradation by heat by incorporating therein an organo-tin complex.

Other objects of this invention will be apparent to those skilled in the art from the disclosure herein.

It is the discovery of the present invention that polyvinyl halide polymers and co-polymers are stabilized against degradation by heat by incorporating therein an organo-tin complex obtained by reacting an aliphatic-nitro compound, e.g. a nitroalkalane or a nitroalkanol, with an alkyl-tin oxide or alkyl-tin chloride in a 1:1 mole ratio. These complexes are employed in polyvinyl halide resin compositions in a proportion of from about 1–10% by weight based on the weight of the polyvinyl halide resin.

DETAILED DISCUSSION

The organo-tin complexes of the present invention are readily prepared by heating an aliphatic nitro compound with an alkyl-tin oxide or an alkyl-tin chloride in a 1:1 mole ratio. The components are suspended in a small amount of toluene or benzene, e.g. about 1 part per 2 parts of reactants. The mixture is heated under reflux at below about 130° C. pot temperature, preferably about 120° C. Water of reaction, (if any) is separated as the azeotrope. At end of reaction period, the solvent is removed, e.g. by distillation, or by evaporation. The complex is then suitable for use without further refining.

The structure of these compounds has not been determined and they are denoted "a complex" as a matter of convenience. It is not intended that the invention be limited by the use of such term however.

The aliphatic nitro compounds useful in the practice of the present invention include but are not limited to nitroalkanes having from 1 to about 6 carbon atoms and nitroalkanol derivatives thereof obtained by condensing the nitroalkane with formaldehyde, as is known. The preferred aliphatic nitro compounds include but are not limited to 2-nitro-2-methyl-1-propanol; 2-nitro-1-butanol; 2 - nitro-2-methyl-1,3-propanediol; 2-nitro-2-ethyl-1,3-propanediol; nitroethane, 2-nitropropane, nitro-cyclohexane and 1-nitropropane. These compounds are available commercially and the usual commercial grades are suitable for the practice of this invention.

The alkyl-tin compounds with which complexes of the foregoing nitro compounds are formed include but are not limited to bis(di-n-butyltin)oxide, bis(tri-n-butyltin) oxide and tri-n-butyltin chloride. These compounds are commercially available and the usual commercial-grade material is suitable for forming the complexes. Other alkyl tin oxides and chlorides are known and are suitable for the practice of this invention. For example, dibutyltin chloride and dibutyltin oxide are suitable for the preparation of stabilizers useful in the practice of this invention.

Broadly, the invention relates to the heat stabilization of halogen-containing resinous compositions produced by halogenating vinyl resins or by polymerizing compositions comprising a vinyl (including vinylidene) halide with or without other copolymerizable compounds. The vinyl halide concerned with is typically and preferably vinyl chloride, although the other halides such as the bromide, iodide and fluoride are also contemplated. Among such compositions are (1) halogenated, e.g., chlorinated polyethylene, the polyvinyl halides, such as, for example, polyvinyl chloride, polyvinyl bromide, polyvinylidene chloride, polyvinylidene fluoride, neoprene, polyvinyl fluoride, etc.; (2) vinyl resins produced by the conjoint polymerization of a vinyl halide, e.g. vinyl chloride, and a vinyl ester of a lower saturated aliphatic monocarboxylic acid, e.g., vinyl acetate (such vinyl chloride-vinyl acetate copolymers being available under the trade name of Bakelite resins (trademark of Union Carbide) wherein the vinyl chloride component is present in a preponderant amount), a vinyl propionate, vinyl butyrate, vinyl hexoate, vinyl acetobutyrate, vinyl chloroacetate, vinyl chloropropionate, etc., it being obvious from the foregoing examples that the term "lower saturated aliphatic monocarboxylic acid" embraces ones containing at most six carbon atoms; (3) vinyl resins produced by the conjoint polymerization of a vinyl halide and an acrylic compound, e.g., the copolymers of vinyl chloride with, for example, ethyl methacrylate, methyl methacrylate, benzyl or chlorobenzyl acrylate, methyl chloroacrylate, etc.; (4) copolymers of vinyl halide, e.g. vinyl chloride, and a vinylidene halide, e.g., vinylidene chloride; and (5) many other vinyl resin copolymers, such as the copolymers of three-component systems, for example, vinyl chloride, vinyl acetate and ethyl methacrylate, etc. As will be understood by those skilled in the art, other multi-component copolymers may be used, the only requirement being that at least one of the components is a vinyl halide. Further methods of preparation of the vinyl halide resins employed herein and additional examples of vinyl halide copolymers which may be stabilized with the alkanolamine-zinc complexes of this invention may be found in e.g., D'Alelio Pats. 2,378,753, issued June 19, 1945, and 2,299,740, issued Oct. 27, 1942.

The halogenated vinyl resins may have incorporated therein various plasticizers such as tricresyl phosphate, dibutyl phthalate, di-(2-ethylhexyl) phthalate, dibutyl sebacate, di-(2-ethylhexyl) sebacate, di-(2-ethylhexyl azelate, epoxidized soybean oil, etc. The amount of plasticizer which may be used may be varied from about ½ to 2 parts, by weight, of the plasticizer to one part of the vinyl halide resin.

Various fillers may also be added in amounts ranging from about 10 to 200 percent or more, by weight, based on the total weight of the filler and the halogenated vinyl resin. Among such fillers may be mentioned carbon black, barytes, zinc oxide, clay, wood flour, and other pigments and fillers commonly used in the rubber and plastics industries.

Various means well known to the art may be used for incorporating the stabilizers of this invention into the resinous compositions, among these being the one disclosed in U.S. Pat. 3,288,744 wherein sheeting on differential rolls (or mill rolls) was employed.

The invention will be understood more fully by reference to the following specific examples. It is understood that the examples are presented for the purposes of illustration only and are not intended as a limitation of the invention.

EXAMPLE 1

1-nitropropane (1-NP) 55 g. and bis(tri-n-butyltin)-oxide (I) 150 g. were reacted in a 1:1 mole ratio in the presence of 100 ml. of benzene, by heating to reflux at a pot temperature of 120° C. and removing 5 ml. of water (about 3 hours). The product was transferred to an evaporating dish and placed in a hood where excess solvent evaporated. The resulting product was a brown liquid, suitable for use without further processing.

A milled sheet was prepared by mixing 100 parts by weight of polyvinyl chloride (Geon 102 EPFI, Suspension type manufactured by B. F. Goodrich Chemical Co.), 40 parts di-(e-ethylhexyl)phthalate, 5 parts of epoxized soya oil plasticizer (Plastolein 9232, manufactured by Emery Industries) and 2 parts of the stabilizer prepared as described above. The ingredients were hand-mixed in a beaker, milled for 5 min. on a 6" x 13", two-roll mill, heated to 325° F. The mixture was formed into a 35–40 mil thick sheet in a period of about 4 minutes, cooled, cut in 1" squares and placed in a rotating-shelf, preheated oven at 350° F. (176° C.). The heating was continued for 5–7 hours and inspection was made each 30 min. until the sheet had darkened until nearly black; the time required indicated the effectiveness of the stabilizer.

The experiment was repeated using (a) a control without stabilizer, (b) an unheated mixture of 1-nitropropane and I as the stabilizer, (c) I alone as the stabilizer.

The following results were obtained:

| Stabilizer: | Time stabilized, hr. |
|---|---|
| (a) None | 1.5 |
| (b) Mixture of 1-NP and I | 1.5 |
| (c) I | 2 |
| (d) 1-NP-I complex | >4.5 |

EXAMPLE 2

The experiment of Example 1 was repeated in all essential details except that nitrocyclohexane was substituted for 1-NP. The resulting brown, liquid complex stabilized the polyvinyl chloride for 4 hours.

EXAMPLE 3

The experiment of Example 1 was repeated in all essential details except that 2-nitro-2-ethyl-1,3-propanediol was substituted for 1-NP. The brown, liquid complex obtained stabilized the polyvinyl chloride for 4 hours.

EXAMPLE 4

The experiment of Example 3 was repeated in all essential details except that 2-nitro-2-methyl-1,3-propanediol (NMPD) 68 g. was substituted for NEPD. The mixture was heated at reflux for 2 hours and 7 ml. $H_2O$ was removed. Unreacted NMPD was separated by filtration. The resulting complex stabilized the polyvinyl chloride for 4 hours.

EXAMPLE 5

The experiment of Example 3 was repeated in all essential details except that tri-n-butyltin chloride (II) was substituted for I. II alone stabilized the polyvinyl chloride for only 1.5 hours, the same as the unstabilized control, but the resulting red-brown complex stabilized it for 4 hours. When II alone was incorporated in the polyvinylchloride resin composition, the resulting composition showed no greater stability than the resin composition alone.

EXAMPLE 6

The experiment of Example 1 was repeated in all essential details except that 2-nitro-2-methyl-1-propanol (NMP) was substituted for 1-NP. The light brown liquid complex obtained stabilized the polyvinyl chloride for 4 hours.

EXAMPLE 7

The experiment of Example 6 is repeated in all essential details except that 2-nitro-1-butanol is substituted for NMP. The resulting complex is a good heat stabilizer for polyvinyl chloride.

EXAMPLE 8

The experiment of Example 1 was repeated in all essential details except that 2-nitropropane was substituted for 1-NP. The resulting pale yellow liquid complex stabilized the polyvinyl chloride for 3 hours.

EXAMPLE 9

The experiment of Example 1 is repeated in all essential details except that nitroethane is substituted for 1-NP. The resulting complex is a good stabilizer for vinyl halide resin compositions against degradation by heat.

EXAMPLE 10

The experiment of Example 1 is repeated in all essential details except that bis(di-n-butyltin)oxide is substituted for bis(tri-n-butyltin)oxide. The resulting complex is a good stabilizer for vinyl halide resin compositions against degradation by heat.

I claim:
1. A stabilizing composition for vinyl halide compositions consisting essentially of an organo-tin complex of a nitroalkane or a nitroalkanol with an alkyl-tin oxide or alkyl-tin chloride in a 1:1 mole ratio.
2. The composition of claim 1 wherein said stabilizing composition is a complex of 1-nitropropane and bis(tri-n-butyltin)oxide.
3. The composition of claim 1 wherein said stabilizing composition is a complex of nitrocyclohexane and bis(tri-n-butyltin)oxide.
4. The composition of claim 1 wherein said stabilizing composition is a complex of 2-nitro-2-ethyl-1,3-propanediol and bis(tri-n-butyltin)oxide.

5. The composition of claim 1 wherein said stabiliizng composition is a complex of 2-nitro-2-methyl-1,3-propanediol and bis(tri-n-butyltin)oxide.

6. The composition of claim 1 wherein said stabilizing composition is a complex of 2-nitro-2-ethyl-1,3-propanediol and tri-n-butyltin chloride.

7. The composition of claim 1 wherein said stabilizing composition is a complex of 2-nitro-2-methyl-1-propanol and bis(tri-n-butyltin)oxide.

8. The composition of claim 1 wherein said stabilizing composition is a complex of 2-nitropropane and bis(tri-n-butyltin)oxide.

References Cited

UNITED STATES PATENTS

| 3,321,481 | 5/1967 | Schroder et al. | 260—429.7 |
| 3,448,130 | 6/1969 | Oakes et al. | 260—429.7 |
| 3,414,595 | 12/1968 | Oakes | 260—429.7 |

JAMES E. POER, Primary Examiner

W. F. W. BELLAMY, Assistant Examiner

U.S. Cl. X.R.

260—45.75 K